United States Patent [19]

Ellis et al.

[11] 4,010,827

[45] Mar. 8, 1977

[54] CLUTCH ENGAGED BRAKE MECHANISM

[75] Inventors: Christopher R. Ellis, Chinley; Richard H. Gibbon, Chapel-en-le-Frith; Walter R. Stirling, Buxton, all of England

[73] Assignee: Ferodo Limited, Manchester, England

[22] Filed: Sept. 4, 1975

[21] Appl. No.: 610,268

[30] Foreign Application Priority Data

Oct. 1, 1974 United Kingdom ............ 42515/74

[52] U.S. Cl. .................... 188/71.2; 188/264 F; 188/264 P; 192/48.5; 192/87.1
[51] Int. Cl.² ..................................... F16D 67/02
[58] Field of Search ............... 188/271, 71.2, 291, 188/264 E, 264 F, 264 P, 71.6; 192/12 A, 12 C, 18 A, 53 B, 87.1, 48.5

[56] References Cited

UNITED STATES PATENTS

| | | | |
|---|---|---|---|
| 1,250,687 | 12/1917 | Smith | 192/53 B |
| 2,807,343 | 9/1957 | Ryder et al. | 192/53 B |
| 2,890,769 | 6/1959 | Hause | 188/71.2 |
| 3,063,529 | 11/1962 | Cook | 192/48.5 X |
| R28,433 | 5/1975 | Ronayne et al. | 192/12 C |

FOREIGN PATENTS OR APPLICATIONS

| | | | |
|---|---|---|---|
| 450,762 | 8/1949 | Italy | 188/264 F |
| 835,698 | 5/1960 | United Kingdom | 188/264 P |

Primary Examiner—George E. A. Halvosa
Attorney, Agent, or Firm—Baldwin, Wight & Brown

[57] ABSTRACT

A friction brake includes a clutch device operable to connect friction plates to a rotary shaft so that they rotate with the shaft when the brake is to be operated by engaging said friction plates with a set of stator plates interleaved therewith.

9 Claims, 1 Drawing Figure

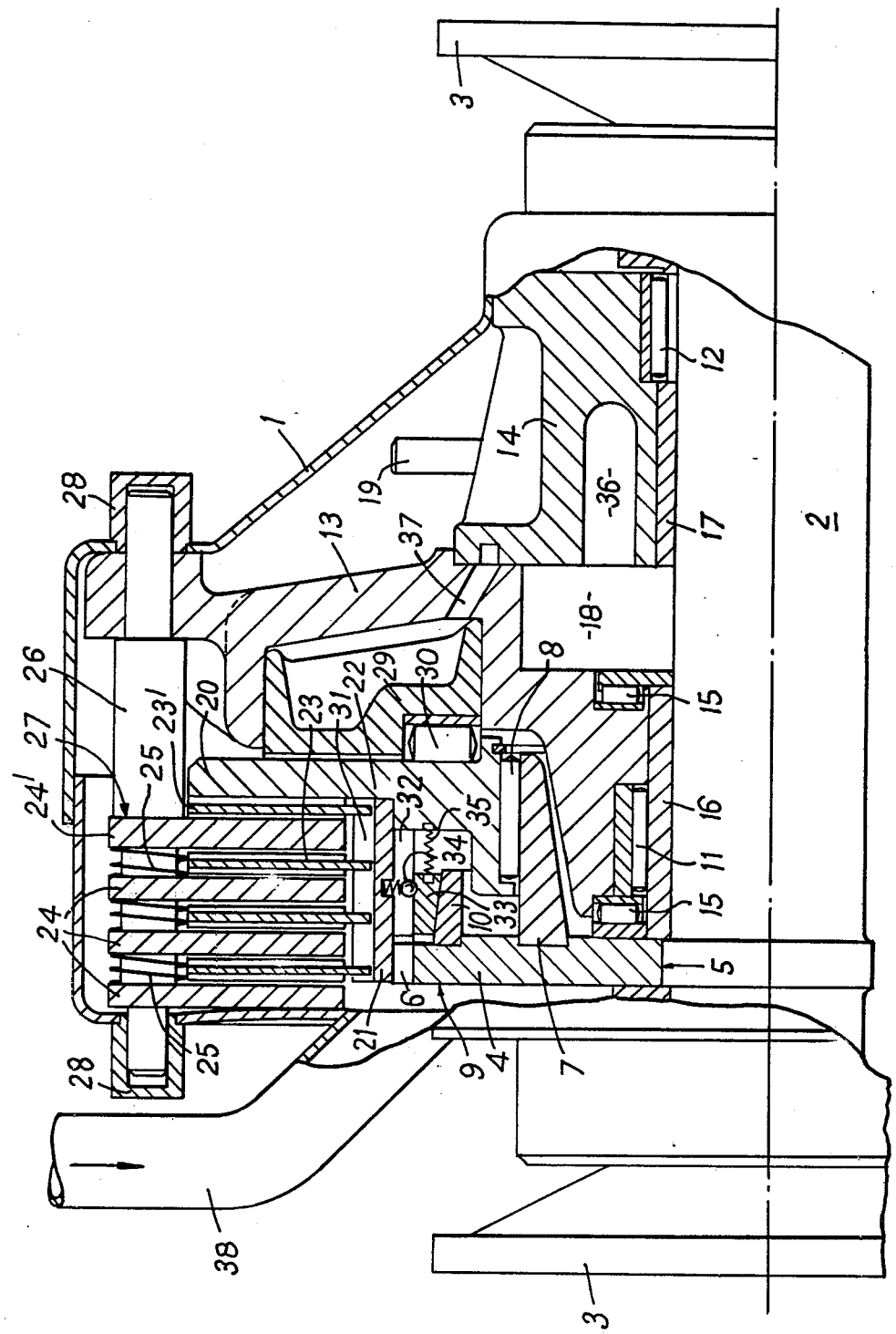

CLUTCH ENGAGED BRAKE MECHANISM

This invention concerns improvements in or relating to hydraulically-operable friction brakes.

More particularly, the invention is concerned with friction brakes of the kind known as vehicle retarders, wherein an hydraulic liquid used as an activating medium also has the purpose of removing from the brake heat generated during periods of operation of the brake.

Such vehicle retarders are known, for example from our U.K. patent specification No. 1,291,722, and generally comprise:

a. a casing, housing a rotary shaft connectible to or forming part of the propeller shaft (or an axle) of a vehicle;

b. a retarding device comprising (i) friction plates arranged and adapted to rotate with the rotary shaft and to be axially slidable relative thereto and (ii) stator plates interleaved with the friction plates and mounted within the casing to be axially slidable relative to the rotary member;

c. an hydraulically operable pressure device arranged and adapted to bring the stator plates and friction plates into frictional engagement on actuation of the retarder;

d. a pump arranged and adapted to circulate hydraulic liquid through the casing, and to supply the liquid under pressure to the pressure device on actuation of the retarder; and e. an actuating device arranged and adapted to actuate the pressure device at will.

In use, such retarders are completely or almost completely filled with hydraulic liquid, but a disadvantage of this is that, since the friction and stator plates are immersed in the hydraulic liquid, considerable 'drag' is generated during periods of rotation of the rotary shaft when the retarder is itself non-operational.

An object of the present invention is to obviate or mitigate the aforesaid disadvantage.

According to the invention, there is provided in a friction brake of the kind aforesaid, having a retarding device, a clutch device arranged and adapted in operation to connect the friction plates and rotary shaft during periods of actuation of the retarding device whereby the friction plates rotate with the shaft, and to disconnect the friction plates and rotary shaft during periods of non-actuation.

Preferably the clutch device comprises an inner hub secured to and rotatable with the rotary shaft, and an outer hub axially movable into engagement with the inner hub under the influence of the pressure device an actuation of the retarding device, said outer hub carrying the friction plates.

Preferably the outer hub is carried on bearings disposed between the inner and outer hubs; and preferably also the inner and outer hubs are provided with cooperable positive engagement means and a synchromesh device. Preferably the cooperable positive engagement means comprises radially disposed gear teeth on a face of the outer hub.

A preferred embodiment of the present invention will now be described by way of example with reference to the drawing accompanying the provisional specification and which is a part-sectional side elevation of a retarder for use in a heavy vehicle.

Referring to the drawing, a vehicle retarder comprises a casing 1 in which is mounted a rotary shaft 2 having flanged ends 3 for connection to sections of a vehicle propeller shaft. An inner hub in the form of an annular disc 4 is electron beam welded at 5 to the rotary shaft 2 to form one part of a clutch device, and has a plurality of gear teeth 6 disposed round its peripheral face. A hardened steel ring 7 forming the inner face for a needle roller bearing 8 permitting axial as well as rotational movement is bolted to the inner hub 4, and the inner hub also has bolted to it at pitch circle diameter 9 the male portion 10 of a conical synchromesh device. The shaft 2 is held in the casing 1 by means of bearings 11 and 12 mounted on castings 13 and 14 and thrust bearings 15 are provided to prevent axial movement of the shaft 2; axial location of the hub 4 is determined by spacers 16 and 17, and by a positive displacement pump 18 driven directly from the shaft 2, the whole system being clamped together by the flanges 3 bolted to the shaft. The casting 14 houses an actuating device (not shown) operated by means of rod 19. An outer hub 20 forming the other part of the clutch device, is free to rotate on the bearing 8, and carries at pitch circle diameter 22 a steel ring 21 provided on one face with gear teeth 32 cooperable with gear teeth 6 and on the opposite face with splines 31 upon which are slidably mounted friction plates 23 and 23'. The friction plates 23 and 23' are inter-leaved with counter plates 24 and 24' urged apart by springs 25 and axially slidably mounted on four pins 26 each having a shoulder 27 against which counter plate 24' bears. The pins 26 are held fast in the casing by means of cups 28.

The casting 14 is provided with an annular chamber in which is mounted an annular piston 29, separated from the outer hub 20 by means of a roller thrust bearing 30. On the opposite side of the hub there is provided the conical female portion 33 of the synchromesh device and this is held in position axially by a spring and ball 34 located in a detent in the steel ring 21, the ball fitting into a groove in the female portion 33. The female portion 33 is provided with a return spring 35. The pump has an inlet 36 and is adapted to supply liquid under a desired pressure determined, for example, by the position of rod 19, via the actuating device, to a port 37, and to circulate the liquid through the casing to an external cooling circuit (not shown) for return line 38.

In use, the vehicle retarder is filled with hydraulic liquid (space being left for thermal expansion of the liquid) and is mounted as part of the propeller shaft of a vehicle, being prevented from rotating therewith by attachment of the casing to the vehicle chassis.

In operation, the rotary shaft and inner hub 4 rotates at a speed proportional to the engine speed (or vehicle speed) and hydraulic liquid is circulated through the casing and the cooling circuit whilst the outer hub 20 and friction plates 23 and 23' are maintained substantially stationary whereby drag is minimised.

When it is desired to retard the vehicle, for example on a downhill run, the actuating device is operated to supply oil under pressure from the pump through the port 37 to the piston 29 which then moves slowly outwards (leftwards in the drawing). This movement of the piston 29 causes the female portion 33 to engage the rotating male portion 10 of the synchromesh device. As synchronisation is achieved, the ball 34 retracts into the detent, allowing the outer hub 20 to move forward under the influence of the piston 29, to permit inter-engagement of the gear teeth 6 and 32 thereby causing the friction plates 23 to rotate with the shaft 2. At the same time, the outer hub 20, pressing against friction plate 23' and counter plate 24', begins to compress the springs 25 and thus bring the friction plates 23 into engagement with the respective counter plates 24 and 24' whereby a retarding torque is generated and caused to act upon the shaft 2. When the retarding operation is completed, the retarding device (constituted by the plates 23, 23', 24, 24' and piston 29) is deactivated by appropriate operation of the actuating device to reduce the pressure of the hydraulic liquid against the back of the piston; the springs 25 expand to separate the plates, retract the piston and disengage the gear teeth 32 from gear teeth 6, so that the drive to the outer hub is released. The ball 34 of the synchromesh device is automatically returned to the groove in the female portion 33 by the return spring 35.

Obviously, many modifications can be made to the embodiment described above. For example, the inner and outer hubs could be provided with simple frictional surfaces, to be brought into engagement on actuation of the retarding device; the piston 29 could be substituted by a bellows piston and the pump could be external of the casing.

We claim:

1. A friction brake characterised by the combination of
  a. a casing housing a rotary shaft connectible to or forming part of the propeller shaft or an axle of a vehicle;
  b. a retarding device comprising (i) friction plates arranged and adapted to rotate with the rotary shaft and to be axially slidable relative thereto and (ii) stator plates interleaved with the friction plates and mounted within the casing to be axially slidable relative to the rotary member;
  c. a hydraulically operable pressure device arranged and adapted to bring the stator plates and friction plates into functional engagement on actuation of the retarding device;
  d. a clutch device arranged and adapted in operation to positively connect the friction plates and rotary shaft during periods of actuation of the retarding device whereby the friction plates will rotate with the shaft, and to disconnect the friction plates and rotary shaft during periods of nonactuation of the retarding device said clutch device including an inner hub directly secured to and rotatable with said rotary shaft, and an outer hub axially movable into engagement with said inner hub under the influence of said pressure device on actuation of said retarding device, the outer hub carrying said friction plates, said inner and outer hubs having cooperable positive engagement means and a synchromesh device between said inner and outer hubs;
  e. a pump arranged and adapted to circulate hydraulic liquid through the casing and to supply the liquid under pressure to the pressure device on actuation of the brake; and
  f. control means arranged and adapted to actuate the pressure device at will.

2. A friction brake according to claim 1, characterised in that the outer hub is carried on bearings disposed between the inner and outer hubs.

3. A friction brake according to claim 1, characterised in that the cooperable positive engagement means comprises radially disposed gear teeth on a face of the inner hub and cooperating radially disposed gear teeth on a face of the outer hub.

4. A friction brake according to claim 1 wherein said inner hub carries an annular supporting ring offset axially to one side thereof, bearing means mounting said outer hub on said annular supporting ring for said axial movement and for rotation relative to said inner hub.

5. A friction brake according to claim 4 wherein said outer hub includes an outer portion axially aligned with said friction plates and forming a clamping plate for axially clamping together said friction plates and said stator plates.

6. A friction brake according to claim 5, characterised in that the cooperable positive engagement means comprises radially disposed gear teeth on a face of the inner hub and cooperating radially disposed gear teeth on a face of the outer hub.

7. A friction brake according to claim 6 wherein said gear teeth are in the form of an internal ring gear and an external ring gear engageable in axially telescoping relation.

8. A friction brake in accordance with claim 1 wherein said synchromesh device is in the form of relative axially moveable cone rings carried by said inner and outer hubs in telescoped relation, one of said cone rings being fixed relative to its respective hub and the other of said cone rings being mounted for relative axial movement relative to its respective hub to permit axial relative movement of said hubs.

9. A friction brake according to claim 8, characterised in that the cooperable positive engagement means comprises radially disposed gear teeth on a face of the inner hub and cooperating radially disposed gear teeth on a face of the outer hub.

* * * * *